United States Patent
Doan et al.

(10) Patent No.: US 10,844,270 B2
(45) Date of Patent: *Nov. 24, 2020

(54) METHOD OF ENHANCING STABILITY OF CEMENT SLURRIES IN WELL CEMENTING OPERATIONS

(71) Applicant: Baker Hughes Incorporated, Houston, TX (US)

(72) Inventors: Angela Anh Doan, Houston, TX (US); Guido Gustavo Narvaez, Houston, TX (US); Matthew Grady Kellum, Spring, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/665,977

(22) Filed: Mar. 23, 2015

(65) Prior Publication Data

US 2015/0198010 A1    Jul. 16, 2015

Related U.S. Application Data

(63) Continuation-in-part of application No. 14/029,520, filed on Sep. 17, 2013.

(51) Int. Cl.

| | |
|---|---|
| *E21B 33/14* | (2006.01) |
| *C09K 8/46* | (2006.01) |
| *C04B 28/02* | (2006.01) |
| *C09K 8/487* | (2006.01) |
| *C04B 28/06* | (2006.01) |
| *C09K 8/467* | (2006.01) |
| *C09K 8/68* | (2006.01) |
| *C09K 8/035* | (2006.01) |
| *C09K 8/88* | (2006.01) |
| *C09K 8/92* | (2006.01) |
| *C09K 8/90* | (2006.01) |
| *C09K 8/70* | (2006.01) |

(52) U.S. Cl.
CPC ............... *C09K 8/46* (2013.01); *C04B 28/02* (2013.01); *C04B 28/06* (2013.01); *C09K 8/467* (2013.01); *C09K 8/487* (2013.01); *C09K 8/035* (2013.01); *C09K 8/685* (2013.01); *C09K 8/70* (2013.01); *C09K 8/887* (2013.01); *C09K 8/90* (2013.01); *C09K 8/92* (2013.01); *E21B 33/14* (2013.01); *Y02W 30/92* (2015.05)

(58) Field of Classification Search
CPC ...................... E21B 33/13; C09K 8/42–49
See application file for complete search history.

(56) References Cited

U.S. PATENT DOCUMENTS

| | | |
|---|---|---|
| 2,629,667 A | 2/1953 | Kaveler |
| 3,132,693 A | 5/1964 | Weisend |
| 3,465,825 A | 9/1969 | Hook et al. |
| 3,551,133 A | 12/1970 | Sprayberry et al. |
| 3,974,077 A | 8/1976 | Free |
| 4,040,967 A | 8/1977 | Nimerick et al. |
| 4,048,077 A | 9/1977 | Englehardt et al. |
| 4,083,407 A | 4/1978 | Griffin, Jr. et al. |
| 4,105,461 A | 8/1978 | Racciato |
| 4,240,840 A | 12/1980 | Downing et al. |
| 4,309,523 A | 1/1982 | Engelhardt et al. |
| 4,568,471 A | 2/1986 | Defosse |
| 4,587,283 A | 5/1986 | Hille et al. |
| 4,784,693 A | 11/1988 | Kirkland et al. |
| 4,888,059 A | 12/1989 | Yamaguchi et al. |
| 4,892,589 A * | 1/1990 | Kirkland ............... C09K 8/46 |
| | | 106/172.1 |
| 4,941,536 A | 7/1990 | Brothers et al. |
| 5,020,598 A | 6/1991 | Cowan et al. |
| 5,105,885 A | 4/1992 | Bray et al. |
| 5,116,421 A | 5/1992 | Ganguli |
| 5,184,680 A | 2/1993 | Totten et al. |
| 5,372,732 A | 12/1994 | Harris et al. |
| 5,421,881 A | 6/1995 | Rodrigues et al. |
| 5,447,197 A | 9/1995 | Rae et al. |
| 5,448,991 A | 9/1995 | Polson et al. |
| 5,464,060 A | 11/1995 | Hale et al. |
| 5,547,506 A | 8/1996 | Rae et al. |
| 5,613,558 A | 3/1997 | Dillenbeck, III |
| 5,658,380 A | 8/1997 | Dillenbeck, III |

(Continued)

FOREIGN PATENT DOCUMENTS

| | | |
|---|---|---|
| EP | 0572261 A1 | 12/1993 |
| EP | 0592217 A2 | 4/1994 |

(Continued)

OTHER PUBLICATIONS

"High-Pressure, High Temperature Technologies," Schlumberger Oilfield Review, Autumn 2008, p. 46-60.*
A. Brandl, G.G. Narvaez, W.S. Bray; "New Slurry Design Concepts Using Multifunctional Additives to Improve Quality and Sustainability of Cementing Systems for Zonal Isolation"; SPE 161352; Oct. 2012; 10 pgs; Society of Petroleum Engineers; Lexington, Kentucky.
B.R. Reddy, Rahul Patil, Sandip Patil; "Chemical Modification of Biopolymers to Design Cement Slurries with Temperature-Activated Viscosification"; SPE 141005; Apr. 2011; 11pgs; Society of Petroleum Engineers; The Woodlands, Texas.

(Continued)

*Primary Examiner* — Andrew Sue-Ako
(74) *Attorney, Agent, or Firm* — John Wilson Jones; Jones Delflache LLP

(57) ABSTRACT

The disclosure relates to a method of delaying viscosification of a well treatment fluid within a well by introducing into the well a cement slurry containing particulates of a hydratable viscosifying agent having a minimum of 90% retention on a 20 mesh screen. The presence of the hydratable viscosifying agent in the slurry prevents settling of the cement after the slurry is pumped into the well. The stability of the slurry is thus enhanced by the presence of the hydratable viscosifying agent.

7 Claims, No Drawings

(56) References Cited

U.S. PATENT DOCUMENTS

| | | | |
|---|---|---|---|
| 5,739,212 | A | 4/1998 | Wutz et al. |
| 5,795,924 | A | 8/1998 | Chatterji et al. |
| 6,145,591 | A | 11/2000 | Boncan et al. |
| 6,165,947 | A * | 12/2000 | Chang et al. ............... 507/216 |
| 6,227,294 | B1 | 5/2001 | Chatterji et al. |
| 6,235,809 | B1 | 5/2001 | Di Lullo Arias et al. |
| 6,376,580 | B1 | 4/2002 | Ikuta et al. |
| 6,444,747 | B1 | 9/2002 | Chen et al. |
| 6,465,587 | B1 | 10/2002 | Bair et al. |
| 6,590,050 | B1 | 7/2003 | Bair et al. |
| 6,591,910 | B1 | 7/2003 | Chatterji et al. |
| 6,617,446 | B1 | 9/2003 | Papadopoulos et al. |
| 6,770,604 | B2 | 8/2004 | Reddy et al. |
| 6,832,652 | B1 | 12/2004 | Dillenbeck et al. |
| 6,869,998 | B2 | 3/2005 | Bair et al. |
| 6,907,928 | B2 | 6/2005 | Di Lullo Arias et al. |
| 6,978,835 | B1 | 12/2005 | Reddy et al. |
| 7,007,754 | B2 | 3/2006 | Fanguy, Jr. et al. |
| 7,021,380 | B2 | 4/2006 | Caveny et al. |
| 7,137,448 | B2 | 11/2006 | Di Lullo Arias et al. |
| 7,271,214 | B2 | 9/2007 | Bair et al. |
| 7,448,449 | B2 | 11/2008 | Di Lullo Arias et al. |
| 7,491,682 | B2 | 2/2009 | Gupta et al. |
| 7,493,955 | B2 | 2/2009 | Gupta et al. |
| 7,598,209 | B2 | 10/2009 | Kaufman et al. |
| 7,631,541 | B2 | 12/2009 | Waugh et al. |
| 7,967,909 | B2 | 6/2011 | Lopez et al. |
| 7,977,283 | B2 | 7/2011 | Gupta et al. |
| 8,096,359 | B2 | 1/2012 | Bray |
| 8,596,356 | B2 | 12/2013 | Brandl et al. |
| 8,636,068 | B2 | 1/2014 | Vorderbruggen et al. |
| 8,664,168 | B2 | 3/2014 | Steiner |
| 8,689,870 | B2 | 4/2014 | Bray et al. |
| 9,010,430 | B2 | 4/2015 | Darby et al. |
| 9,029,300 | B2 | 5/2015 | Gupta |
| 9,102,860 | B2 | 8/2015 | Cawiezel et al. |
| 9,574,130 | B2 | 2/2017 | Gupta |
| 9,656,237 | B2 | 5/2017 | Shen et al. |
| 9,874,080 | B2 | 1/2018 | Gupta |
| 2003/0120027 | A1 | 6/2003 | Valls et al. |
| 2004/0168804 | A1 * | 9/2004 | Reddy et al. ............... 166/295 |
| 2005/0009959 | A1 | 1/2005 | Bair et al. |
| 2005/0139130 | A1 | 6/2005 | Partain, III et al. |
| 2006/0199742 | A1 | 9/2006 | Arisz et al. |
| 2006/0213662 | A1 * | 9/2006 | Creel ............... E21B 27/02 166/286 |
| 2006/0272735 | A1 * | 12/2006 | Pessin et al. ............... 141/69 |
| 2007/0135312 | A1 | 6/2007 | Melbouci |
| 2008/0066652 | A1 | 3/2008 | Fraser et al. |
| 2008/0066654 | A1 | 3/2008 | Fraser |
| 2008/0066655 | A1 | 3/2008 | Fraser |
| 2009/0044726 | A1 | 2/2009 | Brouillette et al. |
| 2009/0149353 | A1 * | 6/2009 | Dajani et al. ............... 507/216 |
| 2011/0053813 | A1 | 3/2011 | Panga et al. |
| 2011/0312858 | A1 | 12/2011 | Holt |
| 2012/0090841 | A1 * | 4/2012 | Reddy ............... C04B 24/38 166/293 |
| 2012/0138300 | A1 | 6/2012 | Bray et al. |
| 2013/0000904 | A1 | 1/2013 | Scoggins |
| 2013/0153222 | A1 | 6/2013 | Pisklak et al. |
| 2014/0000893 | A1 * | 1/2014 | Lewis et al. ............... 166/293 |
| 2015/0075792 | A1 * | 3/2015 | Brandi et al. ............... 166/283 |
| 2015/0330197 | A1 | 11/2015 | Brannon et al. |
| 2017/0198210 | A1 | 7/2017 | Gupta |
| 2017/0226404 | A1 | 8/2017 | Gupta |
| 2017/0350236 | A1 | 12/2017 | Shen et al. |
| 2017/0361376 | A1 | 12/2017 | Murugesan et al. |
| 2018/0072939 | A9 | 3/2018 | Gupta et al. |

FOREIGN PATENT DOCUMENTS

| | | |
|---|---|---|
| EP | 0659702 A1 | 6/1995 |
| EP | 1175378 B1 | 1/2002 |
| FR | 993586 | 11/1951 |
| WO | 1999016723 | 4/1999 |
| WO | 2000063134 | 10/2000 |
| WO | 2002046253 A2 | 6/2002 |
| WO | 2003031365 A1 | 4/2003 |

OTHER PUBLICATIONS

P.A. Sanford, J. Baird, I.W. Cottrell; "Xanthan Gum with Improved Dispersibility"; Apr. 21, 1981; vol. 150; 11 pages; American Chemical Society, San Diego, CA.

Gino G. Du Lullo Arias; "Chemically Modified Polyvinyl Alcohols for Use as Cement Fluid Loss and Gas Control Additive"; Brazilian Application No. PI0904873; Apr. 19, 2011; 34 pages; Verified English Translation.

U.S. Appl. No. 15/593,215, filed May 11, 2017, Gupta et al.

* cited by examiner

METHOD OF ENHANCING STABILITY OF CEMENT SLURRIES IN WELL CEMENTING OPERATIONS

This application is a continuation-in-part of U.S. patent application Ser. No. 14/029,520, filed on Sep. 17, 2013.

FIELD OF THE DISCLOSURE

The disclosure relates to a method of delaying viscosification of a cementitious slurry in a well by including in the slurry hydratable particulates having a minimum of 90% retention on a 20 mesh screen. The presence of the hydratable particulates in the slurry enhances the stability of the slurry by minimizing settling of the cement.

BACKGROUND OF THE DISCLOSURE

Aqueous based well treatment fluids are commonly used in the treatment of a well or a subterranean penetration by a well. Such fluids are used, for instance, in drilling, cementing, stimulation, completion and workover operations. Treatment designs typically mandate such fluids exhibit a certain level of viscosity. Hydratable polymeric viscosifying agents, such as polysaccharides, are often used in such fluids to provide the requisite viscosity. In drilling fluids, such polymers serve to suspend solids and assist in floating debris out of the wellbore. Fracturing fluids typically contain a hydratable polymeric viscosifying agent in order to increase the capability of proppant transport into the fracture. With completion and workover fluids, a viscosifying polymer often functions as a fluid loss pill such that fluid loss is alleviated by the relatively high viscosity that is generated along with any solid material that would be added to deposit onto the formation. Sometimes, such fluids contain one or more additives to delay the hydration of the polymeric viscosifying agent until increased viscosification of the fluid is needed or to allow viscosity to increase over time. This, in turn, minimizes pumping friction pressure.

A common problem in well cementing operations is the loss of liquid fluid from the cementitious slurry into porous low pressure zones in the formation surrounding the well annulus. Hydratable polymeric viscosifying agents are often used in cementitious slurries to control fluid loss and free fluid. In addition, hydratable polymeric viscosifying agents function as rheology modifiers.

Cellulose-based polymers are most commonly used. Such cellulose-based polymers include hydroxyethyl cellulose (HEC), methylhydroxyethyl cellulose (MHEC), carboxymethylhydroxyethyl cellulose (CMHEC), hydroxyethylmethyl cellulose (HEMC), ethylhydroxyethyl cellulose (EHEC), ethylmethylhydroxyethyl cellulose (EMHEC), hydroxypropyl cellulose (HPC), hydroxyethylpropyl cellulose (HEPC) and carboxymethyl cellulose (CMC). In addition, acrylamidomethylpropane sulfonic acid (AMPS) and derivatives thereof as well as polyvinyl alcohols (PVOHs).

Hydratable polymeric viscosifying agents in cement slurries typically hydrate by forming, through hydrogen bonding, a sheath of water molecules around the polymer. Acceleration of hydration can negatively affect the mixing of the cement slurry, especially at desired higher loadings of polymers. In addition, severe thermal thinning and degradation of the chain of the polymeric viscosifying agent results when the polymer is hydrated too quickly. This is particularly true when cellulosic polymers are used as the viscosifying polymer in high temperature applications.

Improved methods of delaying hydration and/or viscosification of hydratable polymeric viscosifying agents in treatment fluids, such as cement slurries, are therefore needed. Improvements are especially needed in high temperature cementing operations to minimize the effects of thermal thinning and degradation of the chain of the viscosifying agent in the cementitious slurry.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

In an embodiment of the disclosure a method of delaying viscosification of a cementitious slurry after pumping the cementitious slurry into a well is provided. In this method, the cementitious slurry pumped into the well contains a cement and a cellulosic derivative. The particle size of the cellulosic derivative is such that a minimum of 90% of the cellulosic derivative is retained on a 20 mesh screen. The presence of the cellulosic derivative in the slurry delays viscosification of the slurry at downhole conditions.

In another embodiment of the disclosure, a method of cementing a pipe or casing in a horizontal well having a bottom hole temperature of at least 200° F. is provided. In this embodiment, a cementitious slurry is pumped into the horizontal well. The slurry contains cement and particulates of a cellulosic derivative. The particle size of the particulates of the cellulosic derivative are such that a minimum of 90% of the particulates are retained on a 20 mesh screen. Non-separation of the cement from the cementitious slurry is enhanced by the size of the cellulosic derivative particulates. The slurry is allowed to harden to a solid mass when desired.

In another embodiment of the disclosure, a method of stabilizing a cementitious slurry pumped into a well having a bottom hole temperature in excess of 200° F. is disclosed. In this embodiment, the cementitious slurry pumped into the well contains cement and a hydratable polymeric viscosifying agent having a particle size sufficient for a minimum of 90% retention of the particulates on a 20 mesh screen. The amount of hydratable polymeric viscosifying agent in the cementitious slurry is sufficient to prevent settling of the cement from the cementitious slurry after the cementitious slurry is pumped into the well.

In another embodiment, a method of decreasing settling of cement particles in a cementitious slurry pumped into a well is disclosed. The slurry contains, as viscosifying agent, particles of a cellulosic derivative having 90% retention on a 20 mesh screen.

In another embodiment, a method of treating a well or a subterranean formation is provided by pumping into the well or formation a fluid containing a hydratable polymeric viscosifying agent composed of particulates having a particle size which exhibit a 90% retention on a 20 mesh screen. The fluid may be a fracturing fluid pumped into the subterranean formation during a hydraulic fracturing operation. The fluid may be pumped into the subterranean formation during a sand control operation. The fluid further may be a drilling fluid pumped into the well during a drilling operation.

Accordingly, the present disclosure includes methods for delaying hydration or viscosification of treatment fluids within a well or formation. Characteristics and advantages of the present disclosure described above and additional features and benefits will be readily apparent to those skilled in the art upon consideration of the following detailed description of various embodiments and referring to the accompanying drawings.

DETAILED DESCRIPTION OF THE PREFERRED EMBODIMENTS

Characteristics and advantages of the present disclosure and additional features and benefits will be readily apparent to those skilled in the art upon consideration of the following detailed description of exemplary embodiments of the present disclosure. It should be understood that the description herein, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular elements and materials. As one skilled in the art will appreciate, different persons may refer to an element and material by different names. This document does not intend to distinguish between elements or materials that differ in name. Also, the terms "including" and "comprising" are used herein and in the appended claims in an open-ended fashion, and thus should be interpreted to mean "including, but not limited to . . . " Further, reference herein and in the appended claims to elements and components and aspects in a singular tense does not necessarily limit the present disclosure or appended claims to only one such component, materials or aspect, but should be interpreted generally to mean one or more, as may be suitable and desirable in each particular instance.

The use of the hydratable polymeric viscosifying agent disclosed herein in a well treatment fluid enables pumping of a low viscosity treatment fluid into a well or into a subterranean formation penetrated by the well and provides a method of delaying viscosification of the fluid until after the fluid is within the well or formation. Delaying hydration of the hydratable polymeric viscosifying agent until after the fluid passes the pump and is within the well minimizes friction pressure placed on the pump.

The hydratable polymeric viscosifying agent may be composed of particulates having a minimum of 40% retention on a 60 mesh screen. In an embodiment, the particulates are characterized by a particle size which maintains a minimum of 60% retention on a 60 mesh screen. In another embodiment, the particulates are further characterized as having a minimum of 1% retention on a 20 mesh screen.

The hydratable polymeric viscosifying agent may further consist of larger coarser particulates. For instance, the particle size of particulates of the hydratable polymeric viscosifying agent may be such that a minimum of 90% of the particulates are retained on a 20 mesh screen and in some in cases a minimum of 95% of the particulates are retained on a 20 mesh screen.

Delayed hydration of the hydratable polymeric viscosifying agents defined herein at in-situ conditions further enables the use of greater amounts of the hydratable polymeric viscosifying agent in the cement slurry while maintaining suitable surface rheology values. This is of particular value in cementing operations since incorporating larger amounts of the hydratable polymeric viscosifying agent negates thermal thinning and keeps solids suspended in the slurry. As temperature increases, the polymer slowly dissolves within the slurry to counteract the thinning.

The coarser particulates offer a particular advantage when used in cementing operations and especially in the cementing of wells having a bottom hole temperature (BHT) of 200° F. or greater (and even 300° F. or greater). In a preferred embodiment of the disclosure, such coarse particulates are used in the cementing of horizontal wells. Maintaining the stability of cement slurries is often difficult in horizontal wells, especially where the slurry is exposed to high temperatures over sustained periods. Such coarse particulates provide stability to the slurry in such cementing operations.

Loss of fluid from the slurry into low pressure zones in the formation surrounding the annulus is prevented or inhibited by the presence of one or more of the hydratable polymeric viscosifying agent disclosed herein. The hydratable polymeric viscosifying agent(s) provide the requisite level of viscosity needed to prevent the loss of fluid into the formation until the desired set time.

The presence of the hydratable polymeric viscosifying agent in the slurry delays settling of the cement within the cementitious slurry until after the slurry is pumped into the well. In particular, the presence of the polymeric hydratable viscosifying agent in the slurry provides for the delay in set time until the slurry is placed into its targeted location within the well. In some instances, the set time of the aqueous slurry may be delayed until downhole temperatures as high as 500° F., even as high as 600° F., are obtained.

In a particularly preferred embodiment, the coarse particulates are composed of cellulosic derivatives, polyvinyl alcohol or an ammonium or alkali metal salt of an acrylamidomethylpropanesulfonic acid as well as mixtures thereof. Preferred cellulosic derivatives include hydroxyethyl cellulose, methylhydroxyethyl cellulose, carboxymethylhydroxyethyl cellulose, hydroxyethylmethyl cellulose, ethylhydroxyethyl cellulose, ethylmethylhydroxyethyl cellulose, hydroxypropyl cellulose, hydroxyethylpropyl cellulose, dialkyl carboxymethyl cellulose, carboxymethylhydroxyethyl cellulose and carboxymethyl cellulose and mixtures thereof.

When used in cement slurries, viscosification of the slurry is more delayed when the hydratable polymeric viscosifying agent of the slurry has a particle size such that a minimum of 90% of the particulates are retained on a 20 mesh screen than a substantially similar slurry having a hydratable polymeric viscosifying agent having a particle size such that less than 90% of the cellulosic derivative is retained on a 20 mesh screen. By the term "substantially similar" it is meant that the cement slurry only differs by the particle size of the hydratable polymeric viscosifying agent. Thus, the slurries being compared have the same viscosifying polymer (though of different particle size), cement mix and water content as well as the same weight components. In other words, the only variable changed between the slurry containing the hydratable polymeric viscosifying agent having a particle size such that 90% of particulates are retained on a 20 mesh screen and the hydratable polymeric viscosifying agent having a particle size such that less than 90% of the particulates are retained on a 20 mesh screen is the size of the particulates. All other variable and all operating conditions remain the same.

Hydraulically-active cementitious materials, suitable for use in the cementitious slurry, include materials with hydraulic properties, such as hydraulic cement, slag and blends of hydraulic cement and slag (slagment), which are well known in the art. The term "hydraulic cement" refers to any inorganic cement that hardens or sets due to hydration. As used herein, the term "hydraulically-active" refers to properties of a cementitious material that allow the material to set in a manner like hydraulic cement, either with or without additional activation. Hydraulically-active cementitious materials may also have minor amounts of extenders such as bentonite, gilsonite, and cementitious materials used either without any appreciable sand or aggregate material or admixed with a granular filling material such as sand, ground limestone, the like. Strength enhancers such as silica powder or silica flour can be employed as well. Hydraulic cements, for instance, include Portland cements, aluminous cements, pozzolan cements, fly ash cements, and the like. Thus, for example, any of the oilwell type cements of the class "A-H" as listed in the API Spec 10, (1st ed., 1982), are suitable hydraulic cements. In addition, the cementitious material may include silica sand/flour and/or weighing agents including hematite or barite.

Mixing water is utilized with the dry cement composition to produce a fluid pumpable slurry of suitable consistency. The dry cement mix may contain the polymeric hydratable viscosifying agent (when the polymeric hydratable viscosifying agent is in the form of a non-liquid), cement and other conventional cementing additives like suspending or thixotropic agents, strength retrogression additives, permeability reducers, weighting materials, permeability reducers and anti-settling agents, etc. API Spec 10, Second Edition, June 1984 which is known in the cement industry, describes an approved apparatus and method for measuring the consistency of cement slurries in terms of Bearden units of consistency (Bc). A pumpable slurry should measure in the range from about 2-20 Bc and preferably be in the range from about 5 to 11 Bc. Slurries thinner than about 5 Bc will tend to have greater particle settling and free water generation.

Depending upon the particular slurry and intended conditions of use, mixing water is utilized in the slurry of the present disclosure in the range from about 30 to 150 weight percent based upon the dry weight of cement and preferably is in the range of about 35 to 90 weight percent.

In a typical cementing operation, the cement slurry is pumped down the inside of the pipe or casing and back up the outside of the pipe or casing through the annular space. This seals the subterranean zones in the formation and supports the casing.

The coarser (or large particle sized) polymeric hydratable viscosifying agent(s) have a relatively small surface area per weight of the polymer in comparison to viscosifying agent(s) of smaller particle size. This results in longer or delayed complete hydration times during mixing with water or well cement slurries, respectively. The presence of the hydratable polymeric viscosifying agent(s) as defined herein in the cementitious slurry therefore inhibits the unwanted increase in viscosity of the slurry until the slurry reaches its targeted site and setting of the cement is desired.

Since hydration of the coarse particle size polymeric hydratable viscosifying agents is time-delayed, surface mixing of the components of the cement mix is facilitated. This ensures, at the same time, greater slurry stability under given downhole conditions. Thus, the delayed hydration or viscosification of the greatly facilitates slurry mixing, requires less mixing energy, reduces slurry mixing time and results in a lower or more favorable initial slurry rheology compared to polymeric hydratable viscosifying agent(s) of finer size. In particular, less mixing energy and slurry mixing time and a reduced initial slurry rheology is evidenced by use in the slurry of one or more polymeric hydratable viscosifying agents composed of particulates having a minimum of 40% retention on a 60 mesh screen and a minimum of 1% retention on a 20 mesh screen than a substantially similar slurry differing only by the presence of finer particulates which do not have a minimum of 40% retention on a 60 mesh screen and a minimum of 1% retention on a 20 mesh screen. Further, less mixing energy and slurry mixing time and a reduced initial slurry rheology is evidenced by use in the slurry of one or more polymeric hydratable viscosifying agents composed of particulates having a minimum of 90% retention on a 20 mesh screen than a substantially similar slurry differing only by the presence of less coarse particulates which do not have a minimum of 90% retention on a 20 mesh screen.

Further, the polymeric hydratable viscosifying agents described herein may further be present in the slurry at a higher loading than a substantially similar cement mix containing the finer particulates of the prior art. The ability to provide a higher loading of cement in the slurry enhances the stability of the slurry at in-situ conditions by minimizing thermal thinning of the slurry during its placement into the wellbore at elevated temperatures. As such, the coarser hydratable polymeric viscosifying agents are useful in eliminating or curtailing the need for excessive amounts of viscosifying agents in combination with large quantities of dispersant to maintain slurry stability at higher temperatures.

Instability of a cement slurry may also result in the formation of free fluid and channeling. This causes cement settling and segregation of cement particulates and may result in the formation of an incomplete cement sheath. This is often the case with deviated wells. The presence of the coarse particulates in the slurry enhances non-separation (or settling) of the cement from the cementitious slurry after the slurry is pumped into the well.

In addition to cement slurries, the polymeric hydratable viscosifying agent(s) described herein may be used in other well treatment fluids where delayed hydration of the polymer or viscosification of the treatment fluid is desired. Such polymeric hydratable viscosifying agent(s) may therefore be used in those well treatment fluids for use in stimulation operations such as in hydraulic fracturing or sand control operations. In addition, the fluids may be used in workover fluids, completion fluids and drilling fluids.

The coarse or granular particle sizes of the polymeric hydratable viscosifying agents simplifies their handling in the field compared to the use of fine powders, the latter often resulting in undesired and hazardous dust formation on location.

In a preferred embodiment, the polymeric hydratable viscosifying agent(s) may be used as the viscosifying agent in fracturing fluids in order to carry proppant into a created or enlarged fracture. The fracturing fluid may be injected into a subterranean formation in conjunction with other treatments at pressures sufficiently high enough to cause the formation or enlargement of fractures or to otherwise expose the proppant material to formation closure stress. Such other treatments may be near wellbore in nature (affecting near wellbore regions) and may be directed toward improving wellbore productivity and/or controlling the production of fracture proppant.

A less viscous fluid is desirable since it minimizes friction pressure placed on the pump. The viscosifying agent provided herein enables a low viscosity fluid to be pumped into the formation and a more viscous fluid for proppant transport to be formed after the fluid passes through the pump and is within the well.

One or more of the polymeric hydratable viscosifying agents described herein may also be used in a well treatment fluid, such as a drilling fluid, workover fluid or a completion fluid, to provide the requisite level of viscosity to prevent the loss of fluid into highly permeable zones of the subterranean formation or into the wellbore.

Further, the polymeric hydratable viscosifying agent may be used in a gravel pack operation to prevent or substantially reduce the passage of formation particles into the wellbore. After introduction of a screen assembly into the well, a slurry containing the polymeric hydratable viscosifying agent may be introduced. Viscosification of the fluid is delayed until the fluid is in contact with the screen assembly.

The fluid loss value for a well treatment fluid at a temperature from about 80° F. to about 160° F. containing a polymeric hydratable viscosifying agent composed of particulates having a minimum of 40% retention on a 60 mesh screen has been observed to be lower than a substantially similar fluid containing an polymeric hydratable viscosifying agent composed of particulates having a particle size which maintain less than 20% retention on a 60 mesh screen and, in most cases, less than 10% retention on a 60 mesh screen.

The polymeric hydratable viscosifying agent as disclosed herein may be crosslinkable or non-crosslinkable and may be considered as a thickening polymer which is hydratable to form a linear or crosslinked gel. In addition to the cellulosic derivatives set forth above, the polymeric hydratable viscosifying agents may include galactomannan gums, guars, derivatized guars, starch, starch derivatives, xanthan, derivatized xanthan and mixtures thereof.

Galactomannan gums include underivatized guar, derivatized guars like hydroxypropyl guar (HPG), carboxymethyl hydroxypropyl guar (CMHPG).

Further examples of polymeric hydratable viscosifying agent(s) also include phosphomannans, scleroglucans, dextrans, starch, starch derivatives, xanthan, derivatized xanthan and mixtures thereof, locust bean gum, welan gum, karaya gum, xanthan gum, diutan, etc.

In an embodiment, the viscosifying agent comprising the polymeric hydratable viscosifying agent may be adsorbed onto a water-insoluble adsorbent. Suitable water-insoluble adsorbents include minerals, fibers, ground almond shells, ground walnut shells, ground coconut shells, activated carbon, activated coals, silica particulates, precipitated silicas, silica, alumina, silica-alumina, calcium silicate, bauxite, kaolin, talc, zirconia, boron and glass, fly ash, zeolites, diatomaceous earth, ground walnut shells, fuller's earth and organic synthetic high molecular weight water-insoluble adsorbents, and clays and mixtures thereof. The weight ratio of polymeric hydratable viscosifying agent to water-insoluble adsorbent is typically between from about 90:10 to about 10:90. In a particularly preferred embodiment, the viscosifying agent is an ammonium or alkali metal salt of an acrylamidomethylpropanesulfonic acid adsorbed onto a water-insoluble adsorbent.

Typically, the amount of viscosifying polymer employed is between from about 15 to about 50, preferably from about 20 to about 30, pounds per 1,000 gallons of water in the fluid. When used in a cement slurry, the amount of viscosifying polymer present in the slurry is that amount sufficient to prevent settling of the cement from the cementitious slurry after the cementitious slurry is pumped into the well.

Where it is desired for the hydratable polymeric hydratable viscosifying agent to form a crosslinked gel, any crosslinking agents suitable for crosslinking the hydratable polymer may be used. Examples of suitable crosslinking agents may include metal ions such as aluminum, antimony, zirconium and titanium-containing compounds, including organotitanates. Examples of suitable crosslinkers may also be found in U.S. Pat. Nos. 5,201,370; 5,514,309, 5,247,995, 5,562,160, and 6,110,875. The crosslinking agent may further be a source of borate ions such as a borate ion donating material. Examples of borate-based crosslinking agents include, but are not limited to, organo-borates, mono-borates, poly-borates, mineral borates, etc.

The amount of crosslinking agent present in the aqueous fluid is that amount required to effectuate gelation or viscosification of the fluid at or near the downhole temperature of the targeted area, typically between from about 0.5 gpt to about 5 gpt based on the liquid volume of the aqueous fluid.

The fluid may also include a crosslinking delaying agent in order to allow for an acceptable pump time of the fluid, especially when using less viscous fluids. The use of a crosslinking delaying agent is desirous in order to delay or inhibit the effect of the crosslinking agent present in low pH fluids. The crosslinking delaying agent inhibits crosslinking of the crosslinking agent until after the well treatment fluid is placed at or near the desired location in the wellbore. For instance, it is common to include a crosslinking delay agent in fracturing fluids to minimize crosslinking of polymeric viscosifying agents until after the fluid passes the pump.

However, crosslinking delaying agents are normally not required since polymer hydration may be delayed due to the large particle size of the polymeric hydratable viscosifying agent.

The well treatment fluid may further contain a complexing agent, gel breaker, surfactant, biocide, surface tension reducing agent, scale inhibitor, gas hydrate inhibitor, polymer specific enzyme breaker, oxidative breaker, buffer, clay stabilizer, or acid or a mixture thereof and other well treatment additives known in the art. When the fluid is a fracturing fluid, the fluid may contain any conventional proppant.

Further, in light of the effect imparted by the polymeric hydratable viscosifying agents in the prevention or inhibition of fluid loss, it generally is not necessary for the well treatment fluid to contain a fluid loss polymeric hydratable viscosifying agent. Thus, common fluid loss additives, such as polyvinyl pyrrolidone and condensates of formaldehyde and sodium salts of a naphthalene sulfonate as well as combinations thereof need not be present in the fluid.

Since hydration of the coarse particle size polymeric hydratable viscosifying agents may be time-delayed hydration, surface mixing of the components of the cement mix is facilitated. This ensures at the same time slurry stability under given downhole conditions.

EXAMPLES

All percentages set forth in the Examples are given in terms of by weight of cement (BWOC) except as may otherwise be indicated.

Examples 1-4

Slurries were prepared by admixing 50:50 fly ash:Class H, 5% silica, 1% cement extender, 0.5% sodium naphthalene sulfonate dispersant mixture, 6% hydroxyethyl cellulose having a minimum of 40% retention on a 60 mesh screen and a minimum of 1% retention on a 20 mesh screen ("Large") and 6% hydroxyethyl cellulose not having a minimum of 40% retention on a 60 mesh screen and less than 1% retention on a 20 mesh screen ("Regular"). Testing was conducted according to API RP 10B-second edition, April 2013. The experimental conditions and results are tabulated in Table I. Replacing either hydroxyethyl cellulose by their larger particle sized sample lowers the rheological values (measured on a Model 35 Fann viscometer having a R1B1 rotor and bob assembly rotating at 300 rpm) in comparative slurries.

TABLE I

| Ex. No. | HEC1 | HEC2 | lignosulfonate % BWOC | Temp ° F. | Rheologies 3/6/100/200/300/200/100/6/3/600 | Fluid Loss | 45° Free Fluid cc's, % |
|---|---|---|---|---|---|---|---|
| 1 | Regular | Regular | 0.3 | ambient | 23/39/230/352/452/369/255/45/30/649 | | |
| | | | | 200 | 43/55/214/298/362/294/212/42/32/522 | 36 | 0 |
| 2 | Large | Large | 0.3 | ambient | 21/18/71/93/99/66/37/6/6/245 @ rt | | |
| | | | | 200 | 38/60/296/406/467/368/254/56/41/512 | 30 | 0 |
| 3 | Large | Regular | 0.1 | ambient | 18/28/158/240/298/243/168/30/20/415 | | |
| | | | | 200 | 52/64/219/308/364/312/207/40/29/509 | 38 | 0 |
| 4 | Regular | Large | 0.1 | ambient | 10/15/121/207/277/202/123/15/10/466 | | |
| | | | | 200 | 40/62/283/417/480/381/264/59/44/554 | 34 | 0 |

Examples 5-14

Class H cement, 0.5% of hydroxyethyl cellulose and fresh water were mixed to provide a slurry having a 16.2 ppg density. Testing was conducted according to API RP 10B-2 second edition, April 2013. The experimental conditions and results are tabulated in Table II. Replacing the regular sized hydroxyethyl cellulose additive with the large hydroxyethyl cellulose additive lowered the API Fluid Loss value of comparative slurries over a varying temperature range.

TABLE II

| Ex. No. | HEC1 | Temp ° F. | Rheologies 3/6/100/200/300/600 | 45° Free Fluid cc's, % | Fluid Loss |
|---|---|---|---|---|---|
| 5 | Regular | ambient | 19/26/206/346/463/788 | | |
| | | 80 | 18/28/255/425/567/810 | 0 | 70 |
| 6 | Large | ambient | 25/28/179/323/456/608 | | |
| | | 80 | 27/44/341/543/703/849 | 0 | 34 |
| 7 | Regular | ambient | 20/27/221/365/482/760 | | |
| | | 100 | 13/20/195/327/435/682 | 0 | 74 |
| 8 | Large | ambient | 18/19/117/211/300/505 | | |
| | | 100 | 23/35/268/439/580/840 | 0 | 46 |
| 9 | Regular | ambient | 18/25/208/349/463/734 | | |
| | | 120 | 12/18/144/244/328/532 | 0 | 149 |
| 10 | Large | ambient | 23/27/177/310/428/631 | | |
| | | 120 | 23/37/244/387/505/709 | 0 | 74 |
| 11 | Regular | ambient | 16/22/180/308/412/689 | | |
| | | 140 | 14/20/135/221/290/441 | 0 | 224 |
| 12 | Large | ambient | 22/30/139/250/334/472 | | |
| | | 140 | 29/41/254/399/518/643 | 0 | 94 |
| 13 | Regular | ambient | 17/22/137/315/421/697 | | |
| | | 160 | 12/16/121/200/263/389 | 0.3 | 252 |
| 14 | Large | ambient | 19/24/151/263/360/570 | | |
| | | 160 | 26/41/236/368/478/633 | 0 | 134 |

Examples 15-18

Class H cement, 35% of silica sand (Examples 17-18) or a mixture of 17.5% silica flour and 17.5% silica sand (Examples 15-16), 3% of lignosulfonate, hydroxyethyl cellulose, fresh water and optionally modified polynaphthalene sulfonate (PS) dispersant were mixed to provide a slurry having a 16.0 ppg density. Testing was conducted according to API RP 10B-2 second edition, April 2013. The experimental conditions and results are tabulated in Table III which demonstrates that replacing regular sized hydroxyethyl cellulose additive with the large hydroxyethyl cellulose additive lowered the rheological values and API Fluid Loss values of comparative slurries at 300° F.

TABLE III

| Ex. No. | HEC, % | PS, % | Temp., °F. | Rheologies 3/6/100/200/300/600 | 45° Free Fluid cc's, % | Fluid Loss |
|---|---|---|---|---|---|---|
| 15 | Regular, 0.9 | 0.2 | ambient 300 | 41/59/343/545/715/873 | 0 | 58 |
| 16 | Large, 0.9 | 0.2 | ambient 300 | 23/27/114/152/253/415 | 0 | 54 |
| 17 | Regular, 0.6 | — | ambient 300 | 81/132/874+/874+/874+/874+ | 0 | 128 |
| 18 | Large, 0.6 | — | ambient 300 | 57/90/461/662/820/874+ | 0 | 36 |

Examples 19-22

Slurries were prepared by admixing Class H cement, 35% silica sand, 1.5% lignosulfonate, 0.01 gallons per sack of defoamer, and a viscosifying agent to provide a slurry density of 16.4 ppg. The hydroxyethyl cellulose (HEC) exhibited a minimum of 90% retention on a 20 mesh screen ("Coarse"). Testing was conducted according to API RP 10B-2 second edition, April 2013.

Dynamic settling testing was performed in a high pressure consistometer having adjustable motor speed control. The slurry was placed in a slurry cup which was equipped with a dynamic settling paddle. The paddle may be prepared by first removing the internal horizontal blades from a standard API paddle and attaching a round flat plate above the remaining horizontal blades of the paddle to collect the solids settling dynamically from the slurry. The slurry cup with the dynamic settling paddle was then placed into a consistometer having a variable speed drive capable of rotating at speeds of 150 rpm and 25 rpm.

The slurry was then brought to the desired bottom hole circulating temperature (BHCT) (300° F.) and pressure conditions using a thickening time while stirring at 150 rpm. This ensures stabilization of the slurry and the equipment at these conditions. Once the slurry was stabilized at the BHCT and BHP, the rotation speed of the consistometer was reduced to 25 rpm while maintaining the temperature and pressure for about 30 minutes. Rotation at the low rpm proceeds for at least 30 minutes. The consistometer was then cooled as quickly as possible until a safe temperature was reached to remove the slurry cup (190° F. or less) and pressure was released. The slurry cup was then removed from the consistometer without inverting it and the condition of the slurry was noted. The top ⅓ of the fluid was then poured into a beaker. The density of the top ⅓ portion of the slurry was then determined from the volume of the slurry and its weight. The densities of the middle and bottom third portions of the fluid were similarly determined. The difference in the slurry density from top to bottom should be no more than 0.5 ppg for lightweight slurries and 1 ppg for heavier slurries.

After all of the fluid had been poured, the paddle was removed from the cup. The height and condition of the cone of settled solids lying on the top of the plate was then noted. A vertical section was cut off of the cone of solids with a spatula, parallel to the vertical bars of the paddle. The conditions of the solids inside the cone were then noted. Characteristics of the cone are determinative of a slurry exhibiting the requisite stability. A fully non-settling fluid will form a cone on the bottom plate of the paddle (zero cone height). The maximum cone height that is considered allowable is about 0.5 inches.

The results of the testing are set forth in Table IV below.

TABLE IV

| Ex. No. | Suspending Material (%) | Δ Density (ppg) | Cone Height (in) | Rheology 3/6/30/60/100/200/300/600 @ rt |
|---|---|---|---|---|
| Comp. Ex. 19 | Biozan (0.5) | 4.3 | 2 | 27/34.5/69/96/124/182/231/360 |
| Comp. Ex. 21 | Diutan Gum (0.15) | 0.8 | 1 | 43/54/92.5/121/151/214/270/415 |
| Comp. Ex. 21 | Synthetic Polymer (1) | 1.8 | 0.5 | 5.5/9.5/36.5/66/100.5/178/247/379 |
| Ex. 22 | Coarse HEC (0.9) | 0.1 | 0.5 | 5/5/13.5/24.5/38/72.5/104/219 |

Exs. 19-22, along with the examples above, illustrate that cementitious slurries containing coarse particulates eliminate previously needed high surface rheologies while ensuring high-temperature cement slurry stability.

The methods that may be described above or claimed herein and any other methods which may fall within the scope of the appended claims can be performed in any desired suitable order and are not necessarily limited to any sequence described herein or as may be listed in the appended claims.

What is claimed is:

1. A method of cementing a pipe or casing in a well having a bottom hole temperature of at least 200° F. which comprises:
    (a) pumping into the well a cement slurry comprising cement and particulates of a hydratable polymeric viscosifying agent wherein the particle size of the hydratable polymeric viscosifying agent particulates is such that a minimum of 90% of the hydratable polymeric viscosifying agent particulates is retained on a 20 mesh screen;
    (b) placing into the well the cement slurry;
    (c) allowing the slurry to harden to a solid mass at the bottom hole temperature of at least 200° F.; and
    (d) cementing the pipe or casing in the well with the cement slurry to form a cement sheath wherein non-separation of the cement from the cement slurry after being pumped into the well is enhanced and thermal thinning of the cement slurry is minimized during placement of the cement slurry into the well by the particle size of the hydratable polymeric viscosifying agent particulates.

2. The method of claim 1, wherein the bottom hole temperature of the well is at least 300° F.

3. A method of decreasing settling of cement particles in a cement slurry during the cementing of a pipe or casing in a well, the method comprising pumping into the well a cement slurry containing a viscosifying agent adsorbed onto a water-insoluble adsorbent, water and cement particles, wherein the amount of viscosifying agent in the cement slurry is between from about 15 to about 50 pounds per 1,000 gallons of water in the cement slurry and further wherein the viscosifying agent exhibits a 90% retention on a 20 mesh screen, wherein settling of the cement particles from the cement slurry is decreased during the cementing of the well until after the cement slurry is pumped into a targeted location within the well and further comprising cementing the pipe or casing in the well with the cement slurry to form a cement sheath.

4. The method of claim 3, wherein the viscosifying agent is a selected from the group consisting of hydroxyethyl cellulose, methylhydroxyethyl cellulose, hydroxyethylmethyl cellulose, ethylhydroxyethyl cellulose, ethylmethylhydroxyethyl cellulose, hydroxypropyl cellulose, hydroxyethylpropyl cellulose, dialkyl carboxymethyl cellulose, carboxymethylhydroxyethyl cellulose and carboxymethyl cellulose and mixtures thereof.

5. The method of claim 3, wherein the water-insoluble adsorbent is diatomaceous earth.

6. The method of claim 5, wherein the hydratable polymeric viscosifying agent is an ammonium or alkali metal salt of an acrylamidomethylpropanesulfonic acid and mixtures thereof.

7. A method of delaying viscosification of a cement slurry during the cementing of a well and after pumping the cement slurry into the well, the method comprising:
(a) pumping into the well a cement slurry, the slurry comprising cement and a hydratable polymeric viscosifying agent, wherein the hydratable polymeric viscosifying agent is an ammonium or alkali metal salt of an acrylamidomethylpropanesulfonic acid and mixtures thereof, wherein the particle size of the hydratable polymeric viscosifying agent is such that a minimum of 90% of the hydratable polymeric viscosifying agent is retained on a 20 mesh screen;
(b) delaying viscosification of the cement slurry; and
(c) cementing the pipe or casing in the well with the cement slurry containing the hydratable polymeric viscosifying agent to form a sheath wherein viscosification of the cement slurry is more delayed than when a substantially similar cement slurry is pumped into the well, the substantially similar cement slurry containing a hydratable polymeric viscosifying agent having a particle size such that less than 90% of the hydratable polymeric viscosifying agent is retained on a 20 mesh screen and further wherein the substantially similar cement slurry only differs by the particle size of the hydratable polymeric viscosifying agent.

* * * * *